(12) United States Patent
Salvin et al.

(10) Patent No.: US 12,728,994 B2
(45) Date of Patent: Sep. 8, 2026

(54) SYSTEM FOR COOLING AN AIRCRAFT GALLEY TROLLEY

(71) Applicant: B/E Aerospace (UK) Limited, Leighton Buzzard (GB)

(72) Inventors: Ashley Salvin, Leighton Buzzard (GB); Daniel H. Wall, Baldock (GB)

(73) Assignee: B/E Aerospace (UK) Limited, Leighton Buzzard (GB)

( * ) Notice: Subject to any disclaimer, the term of this patent is extended or adjusted under 35 U.S.C. 154(b) by 108 days.

(21) Appl. No.: 18/676,990

(22) Filed: May 29, 2024

(65) Prior Publication Data

US 2025/0058876 A1 Feb. 20, 2025

(30) Foreign Application Priority Data

Aug. 18, 2023 (EP) .................................... 23275121

(51) Int. Cl.

*B64D 11/00* (2006.01)
*A47B 31/02* (2006.01)
*A47B 31/06* (2006.01)

(52) U.S. Cl.

CPC .......... *B64D 11/0007* (2013.01); *A47B 31/02* (2013.01); *A47B 31/06* (2013.01); *A47B 2031/023* (2013.01)

(58) Field of Classification Search

CPC ................ B64D 11/0007; B64D 11/04; B64D 2013/0629; A47B 31/02; A47B 31/06; A47B 2031/023

See application file for complete search history.

(56) References Cited

U.S. PATENT DOCUMENTS 4,361,014 A * 11/1982 Blain .................... A47J 39/006 62/DIG. 13
4,969,509 A 11/1990 Merensky
9,957,050 B2 5/2018 Moran
10,155,589 B2 12/2018 Truemper
10,450,069 B2 10/2019 Lu et al.
10,638,834 B2 5/2020 Holtorf et al.
11,072,426 B2 7/2021 Moran
2015/0089968 A1 4/2015 Lu et al.
2015/0266353 A1* 9/2015 Lu .......................... B64D 13/08 62/506
2016/0338488 A1* 11/2016 Garcia ................... A47B 31/06
2017/0101185 A1 4/2017 Truemper
2017/0144763 A1* 5/2017 Moran ............... B64D 11/0007
2017/0370630 A1 12/2017 Klassen et al.
2018/0134389 A1* 5/2018 Singleton ........... B64D 11/0007

OTHER PUBLICATIONS

European Patent Office; European Search Report dated Dec. 14, 2023 in Application No. 23275121.4.

* cited by examiner

*Primary Examiner* — Joseph F Trpisovsky
(74) *Attorney, Agent, or Firm* — SNELL & WILMER L.L.P.

(57) ABSTRACT

A system for cooling an aircraft galley trolley. The system includes a trolley cooling compartment for stowing an aircraft galley trolley; and a heat exchanger to provide cold air to the trolley cooling compartment. The trolley cooling compartment defines an inlet proximal to the base of the trolley cooling compartment for receiving the cold air. The trolley cooling compartment cools the aircraft galley trolley through the transfer of heat to the cold air. The transfer of heat to the cold air heats the cold air to produce warmer air.

12 Claims, 2 Drawing Sheets

SYSTEM FOR COOLING AN AIRCRAFT GALLEY TROLLEY

CROSS-REFERENCE TO RELATED APPLICATIONS

This application claims priority to EP Patent Application No. 23275121.4, filed Aug. 18, 2023 and titled "SYSTEM FOR COOLING AN AIRCRAFT GALLEY TROLLEY," which is incorporated by reference herein in its entirety for all purposes.

FIELD

This disclosure relates to aircraft galleys, and in particular to a system for cooling aircraft galley trolley compartments.

BACKGROUND

Current designs of aircraft galley trolley compartments use heat exchangers spaced apart from the compartment in order to cool it. As a result, a significant amount of expensive ducting is required, which adds weight to the aircraft.

In addition, in order to cool multiple aircraft galley trolley compartments, ducting is required to connect the heat exchanger to each compartment to be cooled.

Furthermore, the current method of cooling of aircraft galley trolley compartments relies on pumping cooling air over the surface of the galley trolley at relatively high speeds. This is an energy intensive process, which is also expensive and uses heavy components.

SUMMARY

When viewed from a first aspect, the present disclosure provides a system for cooling an aircraft galley trolley, the system comprising: a trolley cooling compartment for stowing an aircraft galley trolley; and a heat exchanger arranged to provide cold air to the trolley cooling compartment; wherein the trolley cooling compartment defines an inlet arranged proximal to the base of the trolley cooling compartment for receiving the cold air; wherein the trolley cooling compartment is arranged to cool the aircraft galley trolley through the transfer of heat to the cold air; and wherein the transfer of heat to the cold air heats the cold air to produce warmer air.

The cold air may be any suitable and desired temperature for cooling the aircraft galley trolley, e.g. less than 15° C., e.g. less than 10° C., e.g. less than 5° C.

The warmer air may be cooler than air in the aircraft cabin. For example, the warmer air, while warmer than the cold air, may be less than 20° C., e.g. less than 15° C., e.g. less than 10° C.

In some examples, the heat exchanger is arranged to receive the warmer air; and the heat exchanger is arranged to cool the warmer air to provide the cold air.

In some examples, the trolley cooling compartment defines an outlet arranged proximal to a top of the trolley cooling compartment for expelling the warmer air.

In some examples, the heat exchanger is adjacent to the trolley cooling compartment. For example, the heat exchanger may be positioned within four trolley compartment widths of the trolley cooling compartment, e.g. the heat exchanger may be positioned within 3 m of the trolley cooling compartment, e.g. within 2.5 m, e.g. within 2 m.

In some examples, the heat exchanger is to the side of, e.g. directly beside, the trolley cooling compartment.

In some examples, the heat exchanger is below, e.g. directly below, the trolley cooling compartment.

In some examples, the trolley cooling compartment comprises a first trolley cooling compartment for stowing a first aircraft galley trolley.

In some examples, the system further comprises a second trolley cooling compartment for stowing a second aircraft galley trolley; wherein the second trolley cooling compartment is arranged to cool the second aircraft galley trolley through the transfer of heat to the cold air; and wherein the transfer of heat to the cold air heats the cold air to produce warmer air.

In some examples, the second trolley cooling compartment is fluidly connected to the first trolley cooling compartment so to provide the cold air to the second trolley cooling compartment.

Fluidly connected may be defined as in flow communication, i.e. air may flow between fluidly connected objects.

In some examples, the second trolley cooling compartment shares an adjoining wall with the first trolley cooling compartment; and the adjoining wall defines an opening arranged proximal to a base of the adjoining wall for providing the cold air from the first trolley cooling compartment to the second trolley cooling compartment.

In some examples, the system further comprises: a fan arranged to promote transfer of the cold air from the first trolley cooling compartment to the second trolley cooling compartment at the opening defined by the adjoining wall.

In some examples, the fan arranged to promote transfer of the cold air from the first trolley cooling compartment to the second trolley cooling compartment at the opening defined by the adjoining wall is located within the opening.

In some examples, the opening comprises a first opening.

In some examples, the adjoining wall defines a second opening proximal to a top of the adjoining wall for expelling the warmer air from the second trolley cooling compartment to the first trolley cooling compartment.

In some examples, the system comprises: a fan arranged to promote transfer of the warmer air from the second trolley cooling compartment to the first trolley cooling compartment at the second opening defined by the adjoining wall.

In some examples, the fan arranged to promote transfer of the warmer air from the second trolley cooling compartment to the first trolley cooling compartment at the second opening defined by the adjoining wall is located within the second opening.

In some examples, the system further comprises a third trolley cooling compartment for stowing a third aircraft galley trolley; wherein the third trolley cooling compartment is arranged to cool the third aircraft galley trolley through the transfer of heat to the cold air; and wherein the transfer of heat to the cold air heats the cold air to produce warmer air.

In some examples, the third trolley cooling compartment is fluidly connected to the second trolley cooling compartment so to provide the cold air to the third trolley cooling compartment.

In some examples, the third trolley cooling compartment shares an adjoining wall with the second trolley cooling compartment; wherein the adjoining wall defines an opening arranged proximal to a base of the adjoining wall for providing the cold air from the second trolley cooling compartment to the third trolley cooling compartment.

In some examples, the adjoining wall further defines an opening proximal to a top of the adjoining wall for expelling the warmer air from the third trolley cooling compartment to the second trolley cooling compartment.

In some examples, the third trolley cooling compartment is fluidly connected to the first trolley cooling compartment so to provide the cold air to the third trolley cooling compartment.

In some examples, at least one of the second trolley cooling compartment or the third trolley cooling compartment is not in direct fluid communication with the heat exchanger. For example, the second trolley cooling compartment and/or the third trolley cooling compartment may only be in fluid communication with the heat exchanger via the first trolley cooling compartment. For example, the second trolley cooling compartment may only be in fluid communication with the heat exchanger via the first trolley cooling compartment; and the third trolley cooling compartment may only be in fluid communication with the heat exchanger via the first trolley cooling compartment and the second cooling compartment in combination.

BRIEF DESCRIPTION OF THE DRAWINGS

One or more non-limiting examples will now be described, by way of example only, and with reference to the accompanying figures in which.

DETAILED DESCRIPTION

Figure 1:
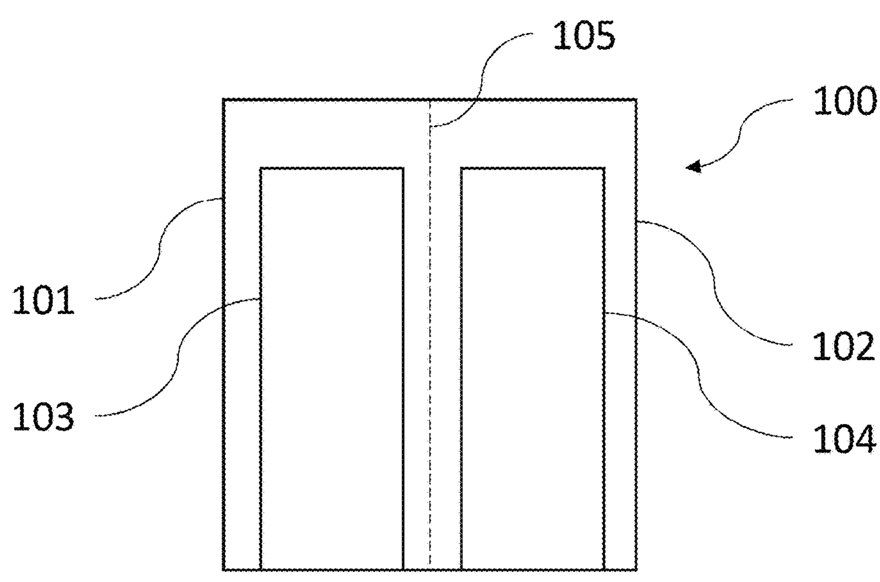
FIG. 1 shows a compartment for cooling one or more trolleys in the galley of an aircraft.

FIG. 1 shows a trolley cooling compartment 100 for cooling one or more aircraft galley trolleys 103, 104. The compartment 100 is installed within a galley of an aircraft. In this example, the compartment comprises a first section 101 and a second section 102. In this example, a first trolley 103 is positioned within the first section 101 for cooling and a second trolley 104 is positioned within the second compartment 102 for cooling.

The division 105 between the sections 101, 102 may physically separate the first section 101 from the second section 102, i.e. the division 105 may be a physical divider. A physical separation between the first section 101 and the second section 102 may help to stow the trolleys 103, 104 within their respective sections 101, 102. Alternatively, the division 105 may denote the hypothetical divide between the first section 101 and the second section 102. In both examples, the first section 101 and the second section 102 are in flow communication, i.e. air can pass freely between the sections 101, 102.

The trolley cooling compartment 100 is filled with cold air in order to cool the trolleys 103, 104. In some examples, the compartment and/or the trolleys are arranged to allow the cooling air to enter the trolleys 103, 104, to provide both internal and external cooling. In some examples, the compartment and/or the trolleys are arranged to allow the cooling air to provide only external cooling to the trolleys 103, 104.

The trolleys 103, 104 may require cooling to keep their contents cool, for example in order to keep food and beverage at a cool temperature.

Figure 2:
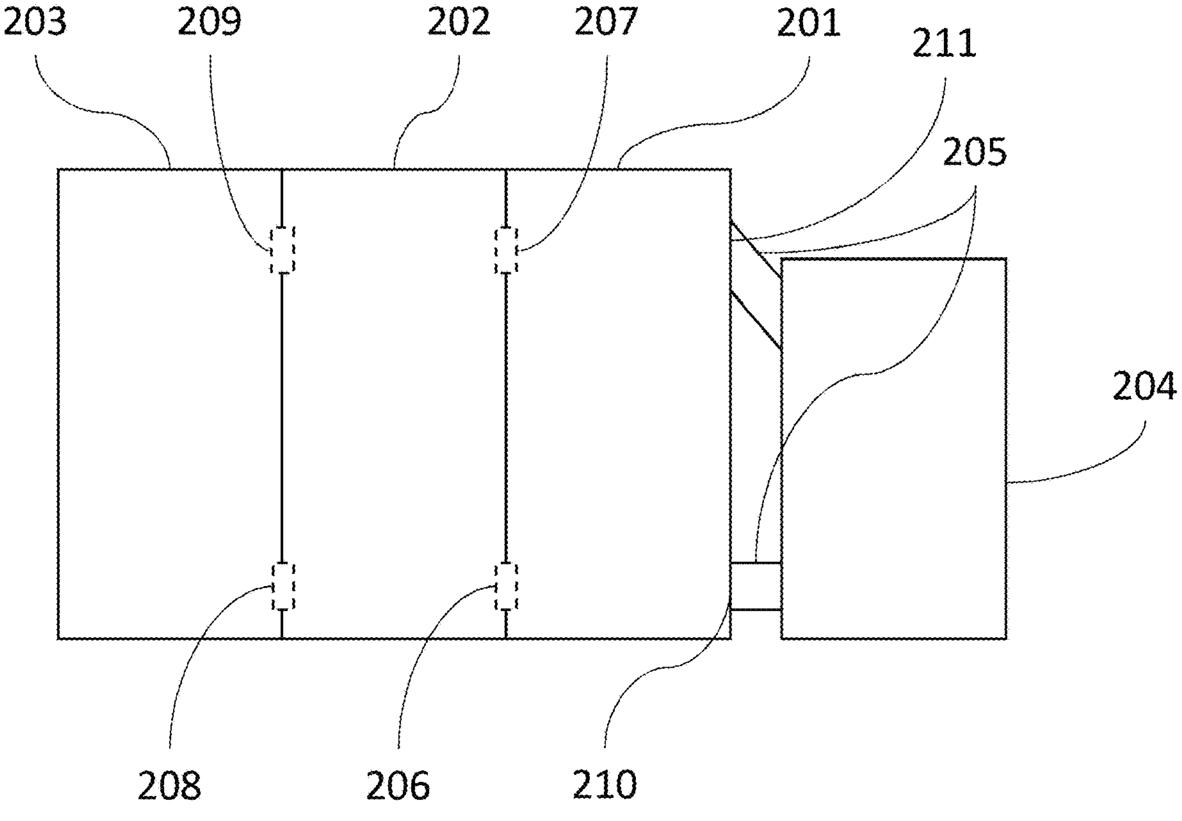
FIG. 2 shows a heat exchanger, for cooling one or more trolley compartments, fluidly connected to a plurality of compartments.

FIG. 2 shows three trolley cooling compartments 201, 202, 203 for cooling trolleys in the galley of an aircraft. Each compartment 201, 202, 203 may be a trolley cooling compartment such as the compartment shown in FIG. 1. The compartments 201, 202, 203 are arranged to be cooled by a heat exchanger 204, i.e. a chiller. The heat exchanger 204 may be, for example, an air conditioning unit.

Conventionally, the heat exchanger for cooling trolley compartments is commonly positioned in the galley above the level of the trolley compartments. This requires a significant amount of ducting in order to connect a heat exchanger to the trolley cooling compartments. However, as shown in FIG. 2, the heat exchanger 204 is adjacent the first compartment 201, so only a very small amount of ducting 205 may be needed to connect the heat exchanger 204 to the first compartment 201.

In this example, cold air from the heat exchanger 204 enters the first compartment 201 via an inlet 210 towards (e.g. proximal) the base of the first compartment 201. Warmer air (that has been warmed by the heat that it has removed from the trolleys in the trolley compartments) leaves the first compartment 201 via an outlet 211 towards (e.g. proximal) the top of the first compartment 201, for cooling by the heat exchanger 204 and subsequent recirculation. While the warmer air is warmer than the cooling air, it may still be cooler than the air of the aircraft cabin. Therefore, it may be energy efficient to supply the heat exchanger 204 with the warmer air from the outlet 211, e.g. compared with using ambient air.

It can be seen from FIG. 2 that the first trolley cooling compartment 201, proximal to the heat exchanger 204, is fluidly connected to the second compartment 202 via a first opening 206 and a second opening 207. The first opening 206 and the second opening 207 are located in a wall between the first trolley cooling compartment 201 and the second compartment 202. The first opening 206 and the second opening 207 may be provided at similar (e.g. the same) heights as the inlet 210 and the outlet 211 respectively.

By fluidly connecting the compartments, cooling air from the heat exchanger 204 may be provided to the second compartment 202 via the first compartment 201. Therefore, no ducting 205 may be needed to fluidly connect the heat exchanger 204 to the second compartment 202.

Similarly, the third compartment 203 may be fluidly connected to the second compartment 202 via a third opening 208 and a fourth opening 209. The third opening 208 and the fourth opening 209 are located in a wall between the second compartment 202 and the third compartment 203. The third opening 208 and the fourth opening 209 may be provided at similar (e.g. the same) heights as the inlet 210 and the outlet 211 respectively and/or at similar (e.g. the same) heights as the first opening 206 and the second opening 207 respectively.

In some examples, a first fan is positioned within the first opening 206 to promote air flow from the first compartment 201 to the second compartment 202. A second fan may be positioned within the second opening 207 to promote air flow from the second compartment 202 to the first compartment 201. Similarly, the third opening 208 and the fourth opening 209 may also house respective third and fourth fans to promote air flow between the second compartment 202 and the third compartment 203. These fans may be low power fans, as convection of the air through the compartments may also be driven by thermal convection forces.

Conventionally, air is pumped through trolley compartments to circulate the air through the compartments and promote heat exchange, by pumping cold air into the top of the trolley compartments and allowing it to flow over the trolleys. However, this is a relatively energy intensive process.

In the example shown in FIG. 2, cold air enters towards the base of the compartments 201, 202, 203, such that they fill with cold air. Circulation of the air occurs primarily as a result of naturally occurring convection currents, such that a significant amount of energy may be saved. In addition, no costly high power fans or pumps may be required, which saves weight on the aircraft.

Figures 3, 4:
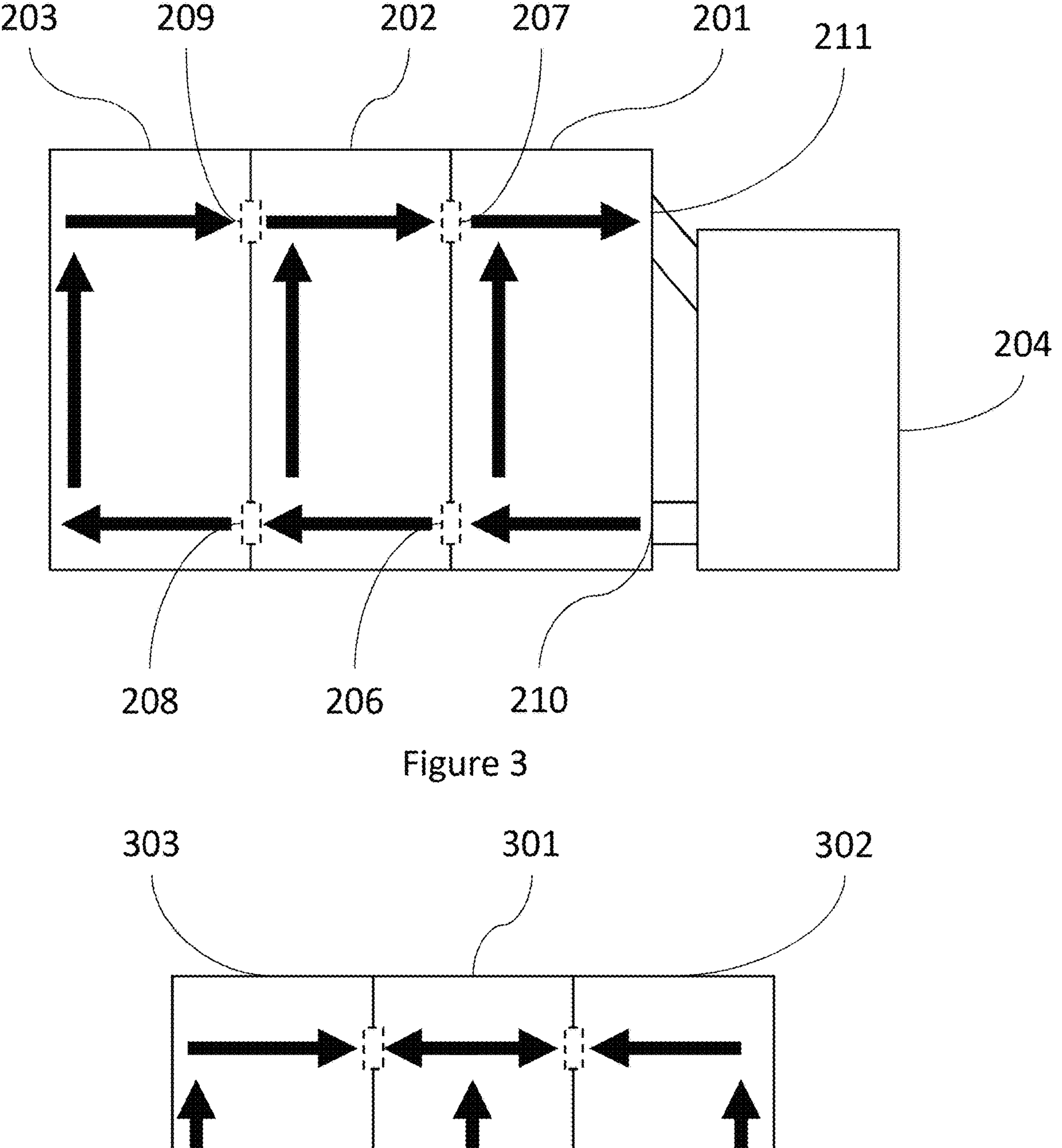
FIG. 3 shows the path of the convection currents of the cooling air, provided by the heat exchanger, through the system of FIG. 2.
FIG. 4 shows another system for cooling one or more trolley compartments.

FIG. 3 shows a simplified path of the convection currents through the system of FIG. 2, as cold air is introduced to the system from the heat exchanger 204. As can be seen, cold air enters the inlet 210 from the heat exchanger 204. As more cold air is introduced into the compartment 201, the compartment 201 fills with cold air, which cools its contents. Relatively warmer air, which is heated up as a result of cooling the contents of the first compartment 201, exits the first compartment 201 via the outlet 211.

Some of the cold air introduced at the inlet 210 enters the second compartment 202 via the first opening 206. In order to promote air flow between the first compartment 201 and the second compartment 202, a fan may be used as described above. The air flow in the second compartment 202 follows a similar path to the air flow in the first compartment 201, as shown. Hence, the warmer air leaves via the second opening 207.

Some of the cold air introduced at the first opening 206 of the second compartment 202 enters the third compartment 203 via the third opening 208. In order to promote air flow between the second compartment 202 and the third compartment 203, a fan may be used as described above. The air flow in the third compartment 203 follows a similar path to the air flow in the first compartment 201 and second compartment 202, as shown. Hence, the warm air leaves via the fourth opening 207.

Owing to the reliance on thermal convection, the various inlets, outlets and openings may be positioned to facilitate this. For example, as warmer air rises, the inlet 210, the first opening 206 and the third opening 208 are positioned towards (e.g. proximal) the base of their respective compartments, as they are for the transfer of cold air through the system. Conversely, the outlet 211, second opening 207 and fourth opening 209 are positioned towards (e.g. proximal) the top of their respective compartments, as they are for the transfer of warmer air through the system.

While the example presented in FIGS. 2 and 3 shows the heat exchanger connected to the first trolley cooling compartment 201, it will be understood that the heat exchanger may be connected to any of the compartments 201, 202, 203. For example, the heat exchanger 204 could instead be adjacent to, and connected to, the second, central, compartment 202 of the three compartments 201, 202, 203 shown.

An example of this arrangement is shown in FIG. 4 in which a heat exchanger (not shown) is adjacent to the central trolley cooling compartment 301. For example, the heat exchanger may be behind the central cooling compartment 301 or immediately below the central trolley cooling compartment 301. The central trolley cooling compartment 301 is fluidly connected to each of the side trolley cooling compartments 302, 303. The path of the convection of air through the compartments 301, 302, 303 is also shown.

What is claimed is:

1. A system for cooling a first aircraft galley trolley and a second aircraft galley trolley, the system comprising:

a first trolley cooling compartment for stowing the first aircraft galley trolley;

a second trolley cooling compartment for stowing the second aircraft galley trolley; and a heat exchanger arranged to provide cold air to the first trolley cooling compartment;

wherein the first trolley cooling compartment defines an inlet arranged proximal to the base of the first trolley cooling compartment for receiving the cold air;

wherein the second trolley cooling compartment shares an adjoining wall with the first trolley cooling compartment;

wherein the adjoining wall defines an opening arranged proximal to a base of the adjoining wall for providing the cold air from the first trolley cooling compartment to the second trolley cooling compartment;

wherein the first trolley cooling compartment is arranged to cool the first aircraft galley trolley through the transfer of heat to the cold air and the second trolley cooling compartment is arranged to cool the second aircraft galley trolley through the transfer of heat to the cold air;

wherein the transfer of heat to the cold air heats the cold air to produce warmer air;

wherein the system further comprises a fan located within the opening; and wherein the fan is arranged to promote transfer of the cold air from the first trolley cooling compartment to the second trolley cooling compartment at the opening.

2. The system as claimed in claim 1, wherein the heat exchanger is arranged to receive the warmer air; and wherein the heat exchanger is arranged to cool the warmer air to provide the cold air.

3. The system as claimed in claim 1, wherein the first trolley cooling compartment defines an outlet arranged proximal to a top of the first trolley cooling compartment for expelling the warmer air.

4. The system as claimed in claim 1, wherein the heat exchanger is adjacent to the first trolley cooling compartment;

wherein the heat exchanger is to the side of the first trolley cooling compartment; or wherein the heat exchanger is below the first trolley cooling compartment.

5. The system as claimed in claim 1, wherein the opening comprises a first opening; and wherein the adjoining wall defines a second opening proximal to a top of the adjoining wall for expelling the warmer air from the second trolley cooling compartment to the first trolley cooling compartment.

6. The system as claimed in claim 5, wherein the system comprises:

a second fan arranged to promote transfer of the warmer air from the second trolley cooling compartment to the first trolley cooling compartment at the second opening defined by the adjoining wall;

wherein the second fan is located within the second opening.

7. The system as claimed in claim 1, wherein the system further comprises a third trolley cooling compartment for stowing a third aircraft galley trolley;

wherein the third trolley cooling compartment is arranged to cool the third aircraft galley trolley through the transfer of heat to the cold air; and wherein the transfer of heat to the cold air heats the cold air to produce the warmer air.

8. The system as claimed in claim 7, wherein the third trolley cooling compartment is fluidly connected to the second trolley cooling compartment so to provide the cold air to the third trolley cooling compartment.

9. The system as claimed in claim 8, wherein the third trolley cooling compartment shares a second adjoining wall with the second trolley cooling compartment; and wherein the second adjoining wall defines an opening arranged proximal to a base of the second adjoining wall for providing the cold air from the second trolley cooling compartment to the third trolley cooling compartment.

10. The system as claimed in claim 9, wherein the second adjoining wall further defines an opening proximal to a top of the second adjoining wall for expelling the warmer air from the third trolley cooling compartment to the second trolley cooling compartment.

11. The system as claimed in claim 7, wherein the third trolley cooling compartment is fluidly connected to the first trolley cooling compartment so to provide the cold air to the third trolley cooling compartment.

12. The system as claimed in claim 7, wherein at least one of the second trolley cooling compartment or the third trolley cooling compartment is not in direct fluid communication with the heat exchanger.

* * * * *